United States Patent [19]
Baumgart et al.

[11] Patent Number: 5,528,922
[45] Date of Patent: Jun. 25, 1996

[54] METHOD OF MAKING DISK BUMPS WITH LASER PULSES FOR CALIBRATING PZT SLIDERS

[75] Inventors: Peter M. Baumgart, San Jose; Karl A. Flechsig, Los Gatos; Michael F. Lee, Los Altos; Wing P. Leung, Arcadia; Ullal V. Nayak, San Jose; Thao A. Nguyen, San Jose; Timothy C. O'Sullivan, San Jose; Andrew C. Tam, Saratoga, all of Calif.

[73] Assignee: International Business Machines Corporation, Armonk, N.Y.

[21] Appl. No.: 364,562

[22] Filed: Dec. 27, 1994

[51] Int. Cl.$^6$ ............................................. B23K 26/00
[52] U.S. Cl. ......................................... 73/1 J; 29/557
[58] Field of Search ................... 73/1 J, 105; 72/54, 72/56; 360/135; 29/400.1, 557, 558; 430/945; 428/65.3

[56] References Cited

U.S. PATENT DOCUMENTS

| | | |
|---|---|---|
| Re. 33,777 | 12/1991 | Woodroffe . |
| 4,608,480 | 8/1986 | Bizot et al. . |
| 4,931,338 | 6/1990 | Toffle .................... 360/135 |
| 5,062,021 | 10/1991 | Ranjan et al. ............. 360/135 |

*Primary Examiner*—Robert Raevis
*Attorney, Agent, or Firm*—Baker, Maxham, Jester & Meador

[57] ABSTRACT

A method is provided for making crater shaped bumps on a calibration disk which can be used for calibrating a PZT slider, the PZT slider in turn being used for detecting predetermined asperities on a production run magnetic disk. The crater shaped bumps emulate predetermined asperities of production run magnetic disks and especially asperities which are undesirable and would cause the production run disk to be discarded after testing by the PZT slider. Crater shaped bumps which emulate undesirable asperities on current production runs of magnetic disks have a diameter in the range of 10 to 25 μm and a peripheral ridge with a height $h_r$ above a nominal surface of the calibration disk in the range of 75 to 120 nm. Close tolerance crater shaped bumps with this configuration can be made by impinging two or more pulses of laser energy on the same location of a calibration disk. By increasing the number of pulses the height of the peripheral ridge progressively increases. By employing multiple pulses, the height of the peripheral ridge is increased while the diameter of the crater shaped bump stays substantially constant. Further, by employing multiple pulses diameters and heights of crater shaped bumps can be produced with close tolerances within a diameter range of 5 to 20 μm and a height range of 2 to 120 nm. Different arrangements of the crater shaped bumps on a calibration disk are provided for increasing the range of calibration of the PZT slider.

14 Claims, 8 Drawing Sheets

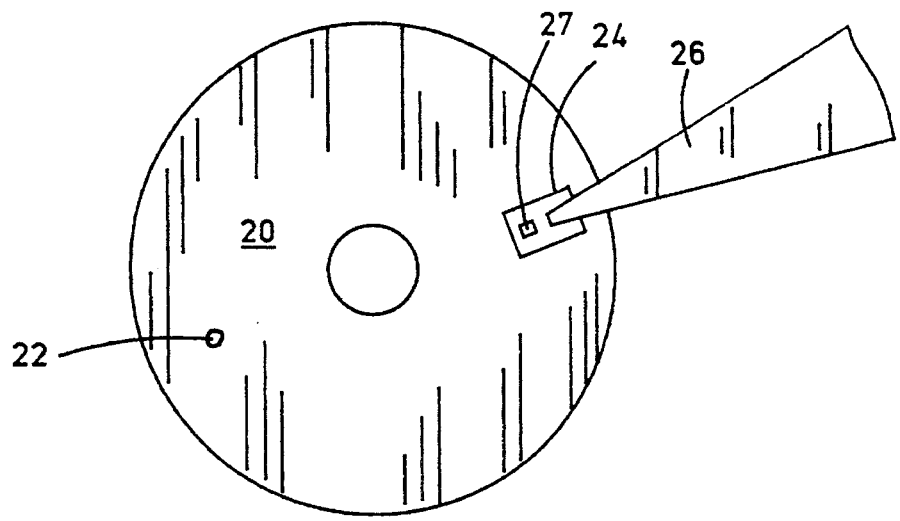
FIG. 1 (Production Run Disk)
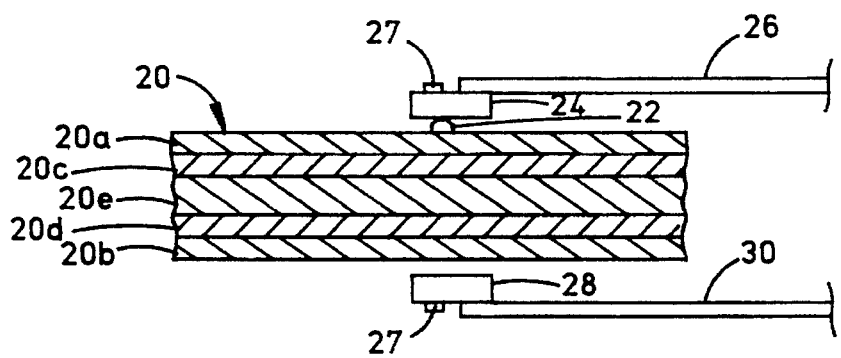
FIG. 2 (Calibrated PZT Sliders & Production Run Disk)
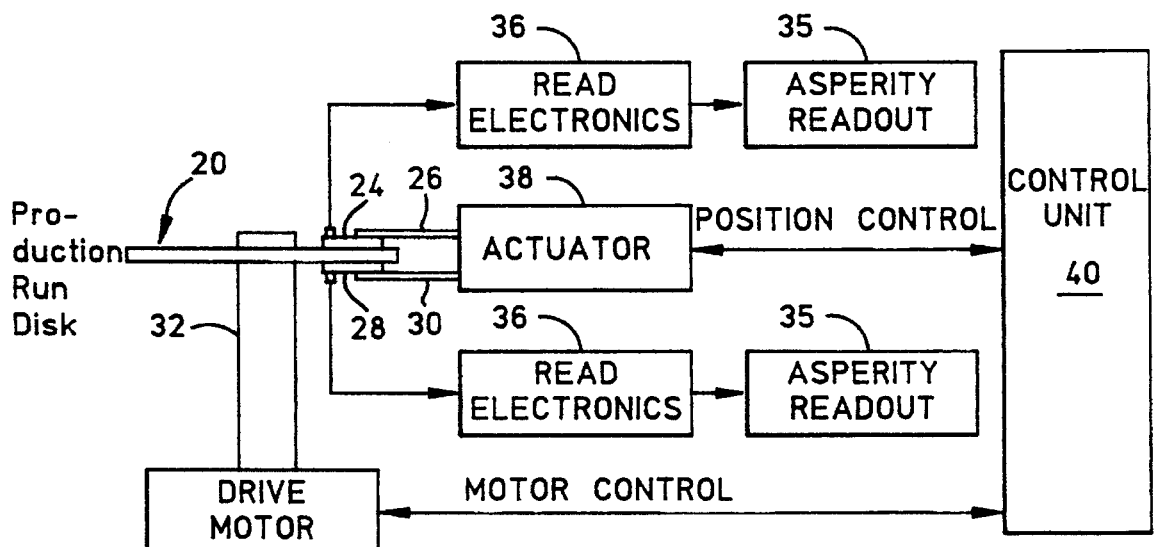
FIG. 3 (Testing for Asperities)

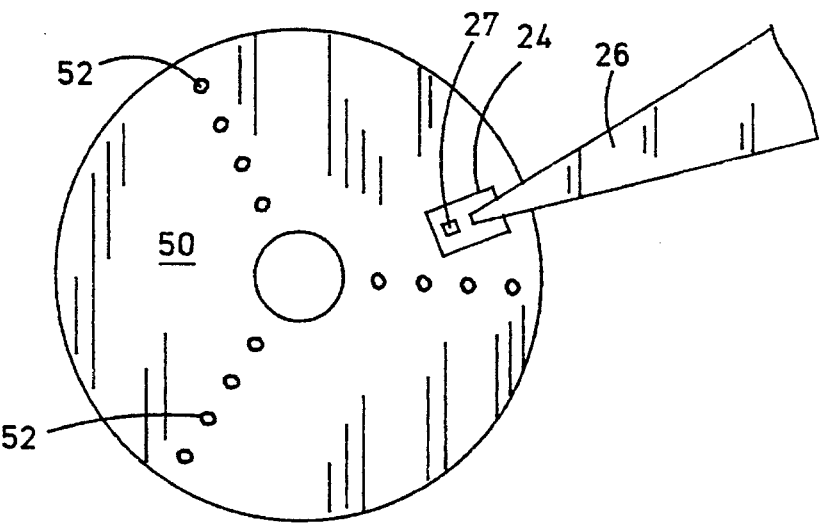
*FIG. 4* (Calibration Disk)
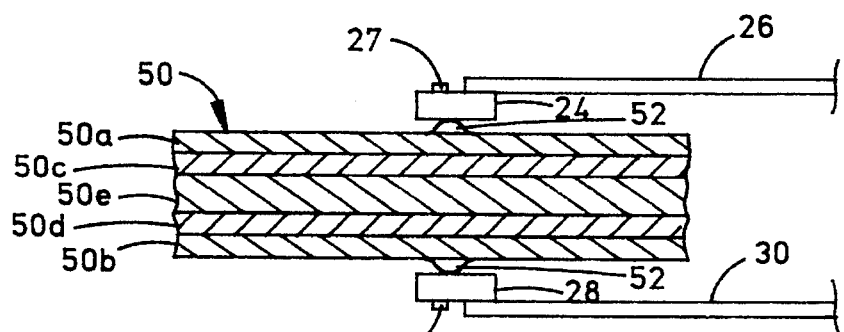
*FIG. 5* (PZT Sliders & Calibration Disk)
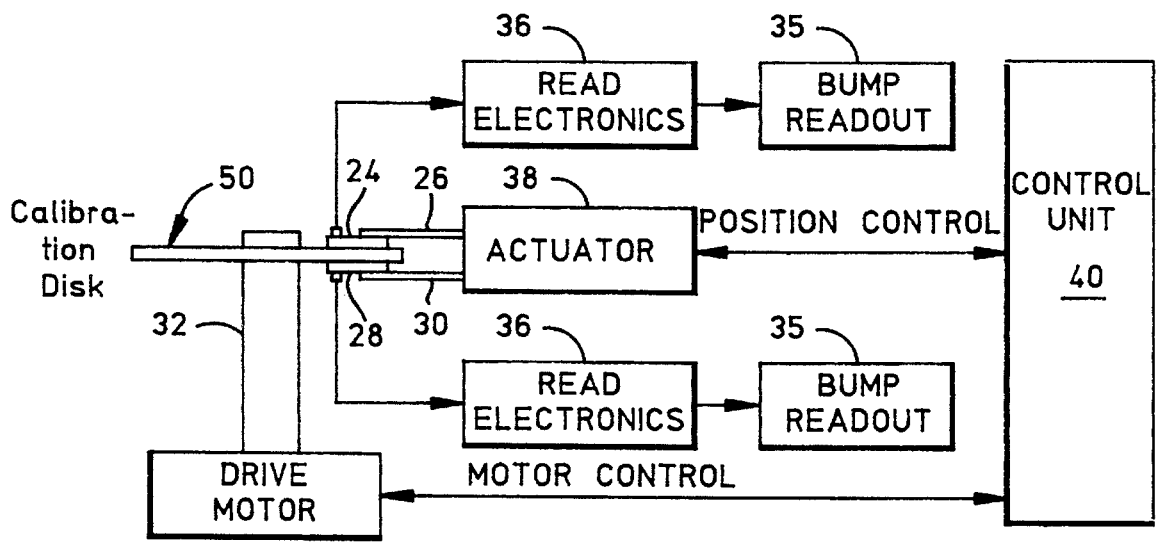
*FIG. 6* (Calibrating PZT Sliders with Calibration Disk)

METHOD OF MAKING DISK BUMPS WITH LASER PULSES FOR CALIBRATING PZT SLIDERS

CROSS-REFERENCE TO RELATED APPLICATION

This application is related by common inventorship, common assignee and subject matter to co-pending patent application Ser. No. 08/150,525 filed on Nov. 11, 1993 entitled "PROCEDURE EMPLOYING A DIODE-PUMPED LASER FOR CONTROLLABLY TEXTURING A DISK SURFACE" which is incorporated by reference herein.

BACKGROUND OF THE INVENTION

1. Field of the Invention

The invention relates to a method of employing laser pulses to make bumps on a calibration disk which can be used for calibrating a PZT (piezoelectric transducer) slider, and more particularly to employing multiple laser pulses to make bumps on a calibration disk which emulate asperities which exceed a predetermined height tolerance specification for a production-run disk.

2. Description of the Related Art

It is important that production run magnetic recording disks be tested for asperities prior to sale. When these disks are rotated in a disk drive, a magnetic head on a slider contacts the surface of a magnetic disk or rides on a cushion of air ("flies"), referred to as an air bearing, slightly above the surface of the disk (in the order of 0.075 µm). Asperities which are high enough to impact the magnetic head slider during disk operation can cause failure of the drive. Accordingly, production run disks with asperities above a predetermined height (tolerance) must be ferreted out and discarded.

Production run magnetic disks are tested as part of the fabrication process for asperities by a slider which carries a piezoelectric transducer (PZT), the slider being referred to hereinafter as a PZT slider. The slider portion of the PZT slider emulates a magnetic head slider in a user's disk drive. When the production run disk is tested for asperities, the PZT slider rides on an air bearing at substantially the same distance from the disk as the magnetic head slider in the user's disk drive. The PZT slider both bends and moves as a rigid body due to the force of asperity impact. Both effects produce an electrical output, indicating asperity contact. When an asperity on the production run disk exceeds a predetermined tolerance, the PZT slider detects and indicates the asperity on a readout. The defective production run disk can then be discarded.

It is important that the PZT slider be properly calibrated to test for asperities on the production run disk. Accordingly, the PZT slider must be calibrated with bumps on a calibration disk which emulate undesirable asperities of a production run disk. The calibration of PZT sliders by prior art calibration disks with bumps has not been satisfactory since the bumps did not accurately and consistently emulate asperities on a production run disk. Presently, asperities are tested for diameters $D_r$ in the range of 15 to 25 µm and a height in the range of 75 to 120 nm. It is expected that future testing will involve asperities with a diameter $D_r$ as small as 5 µm and a height as low as 5 nm. When a calibration disk is fabricated it is important that asperities have a diameter tolerance of 2 µm and a height tolerance of 2 nm. These tolerances have not been obtainable by the prior art.

One method of making bumps on a calibration disk is to indent the disk with a sharp instrument such as a needle. This produces a crater shaped bump approximately 200 µm in diameter with a peripheral ridge that has a height above a nominal surface of the calibration disk of approximately 50 to 130 nm. The diameter of these crater shaped bumps is large and the peripheral ridge of the crater has a gradual slope from the nominal surface of the calibration disk. Another method of making calibration bumps employs jet plating of nickel onto a nickel phosphorus layer of a calibration disk surface. This method produces rounded bumps which have a diameter in the order of 50 to 1,000 um. These diameters are too large to emulate the asperities on a production run disk. Still another method of making calibration bumps on a calibration disk is to sputter tungsten or some other hard material onto the disk through a mask. These bumps which are larger in diameter than the aforementioned bumps, are made large to achieve sufficient durability and adhesion to the disk. With the small sliders used in current disk drives, the slider partly complies with the smooth, slowly rising prior art bumps. This results in an undetermined amount of interference of the slider with the bump and makes calibration of the PZT slider difficult. The search has been for a method of making smaller sized bumps on a calibration disk within the tolerances set forth hereinabove so as to emulate predetermined asperities of a production run disk.

In U.S. Pat. No. 5,062,021 Ranjan discloses a method of making crater shaped bumps on a magnetic disk using a laser pulse. These bumps roughen the relatively smooth surface of a magnetic disk to overcome stiction problems between a magnetic head slider and the disk during take-off and landing of the slider. The diameter of these crater shaped bumps is 0.8 mils and the height of the peripheral ridge of the crater above the nominal surface of the disk is in the range of 0.5 to 0.8 microinches. This diameter equates to 20 µm and the ridge height equates to a range from 12.5 to 20 nm. This height range is too low for most current products, and the heights are not repeatable. Also, Ranjan does not teach glide calibration.

In U.S. Pat. No. 5,236,763 Luthi discloses a method of making elliptical crater shaped disks by impinging multiple pulses of a laser beam on a printing roller as the printing roller rotates relative to the laser beam. The elliptical shape is caused by the relative rotation, the first laser beam impinging on the printing roller at one location and the next laser beam impinging on the printing roller at a displaced second location. This can destroy the configuration of the peripheral ridge of the elliptical crater at the first location and will produce another peripheral ridge at the second location which is distorted somewhat by the remnants of the first peripheral ridge. Luthi does not disclose the height of the remaining peripheral ridge; however, the major and minor diameters of his elliptical crater shaped bump are 82 µm and 60 µm, respectively. The diameters of Luthi's bumps exceed the diameters of crater shaped bumps which emulate asperities on a production run disk.

In the aforementioned co-pending patent application, Ser. No. 08/150,525, a plurality of bumps are fabricated on a production run disk to overcome the problem of stiction between a disk and a magnetic head slider when the slider takes off and lands with respect to the disk. Methods are disclosed for making two types of bumps, one bump being a crater shaped bump and the other bump being a sombrero-shaped bump. The diameter of both bumps were in the order of 25 µm. The highest elevation of the sombrero hat bump was a central peak that rises 25 nm above the nominal surface of the disk. The height of the peripheral ridge of the crater shaped bump was somewhat less than the height of the central peak of the sombrero hat bump. A single pulse of energy was employed to make these bumps. Exemplary laser beam fluences were 1.0 J/cm$^2$, 1.5 J/cm$^2$ and 2.0 J/cm$^2$. The spot diameter was approximately 10 µm and the duration of the pulse was from 0.3 to 90 ns. The crater shaped bump of this application does not emulate the sought for asperity of a production run disk since its peripheral ridge is too low. Further, the sought for bump height within is not sufficiently repeatable with a single laser pulse.

SUMMARY OF THE INVENTION

There has been a long-felt need for a method of making calibration bumps on a calibration disk which simulate the sought for asperities of a production run disk. If the calibration disk is not properly made, a PZT slider cannot be properly calibrated for testing production run disks. When production run disks are tested with an inaccurately calibrated PZT slider, either too many or too few disks are rejected. Prior art methods of making calibration bumps on a calibration disk make the bumps too large, not sufficiently durable or too gradual in slope to simulate asperity contact. Further, the prior art methods produce bumps which exceed acceptable tolerances and therefore are not repeatable. While prior art laser-formed crater shaped bumps are of interest, the peripheral ridge of these craters has heretofore not been high enough above the nominal surface of the calibration disk to produce the desired simulation and are not repeatable within the tolerances stated hereinabove.

We have discovered a unique implementation of a laser beam for producing calibration bumps of the desired size. By impinging at least two pulses of a laser beam on the same location of the calibration disk, a crater shaped bump can be formed with close tolerances. We have found that this desirable result cannot be achieved by impinging only one pulse of a laser beam on the disk regardless of its fluence (energy density expressed as J/cm$_2$). When the fluence exceeds a certain amount, the laser beam literally explodes particles out of the disk, resulting in a poorly defined calibration bump. When the fluence is just below this amount, a well-formed crater shaped bump is formed; however its peripheral ridge can be too low to simulate the sought-for asperity and it is not sufficiently repeatable. We have discovered that by impinging two or more pulses of a laser beam on the same location the height of the peripheral ridge of the crater shaped bump progressively increases. With this method, crater shaped bumps can be produced with a diameter $D_r$ in the range of 5 to 20 µm and with a height $h_r$ of the peripheral ridge above the nominal surface of the calibration disk in the range of 3 to 584 nm, the diameter tolerance being 2 µm and the height tolerance being as low as 2 nm.

When multiple pulses of a laser beam are impinged on the same location of a disk the first laser pulse melts a spot-size which pushes melted material outward from the spot to form a peripheral ridge. When the second laser pulse is focused in the same location, additional material is melted within the crater to push more molten material onto the peripheral ridge caused by the first laser pulse. When subsequent laser pulses are focused on this same spot the height of the peripheral ridge of the crater shaped bump progressively increases. What is surprising about the multiple laser pulsing on the same location of a calibration disk is that the increase in height of the peripheral ridge is substantially linear and can be controlled within close tolerances as compared to a single laser pulse. By making multiple calibration bumps on a calibration disk with different heights according to our teachings, a PZT slider can be calibrated for a range of sizes of asperities on a production run disk. This enables a PZT slider which can precisely check for a range of sizes of asperities on a production run disk.

An object of the present invention is to make a crater shaped calibration bump on a magnetic calibration disk which emulates an asperity of a production run magnetic disk.

Another object is to employ multiple laser pulses to make a crater shaped bump on an article with a well formed peripheral ridge of a predetermined height on a repeatable basis.

A further object is to employ multiple laser pulses to produce a well formed crater shaped bump with a diameter $D_r$ in the range of 5 to 20 µm, with a tolerance of 2 µm and with a height $h_2$ of a peripheral ridge in the range of 2 to 584 nm with a tolerance as low as 2 nm.

Still another object is to provide a calibration disk for calibrating PZT test sliders with a diameter tolerance of 2 µm and a height tolerance of 2 nm which has a plurality of crater shaped bumps which emulate different sizes of asperities on a production run disk.

Yet another object is to provide a method of calibrating a PZT test slider with a calibration disk which has one or more crater shaped bumps which emulates one or more asperities of a production run magnetic disk.

Still another object is to provide a method of testing a production run magnetic disk for asperities by employing as PZT test slider which has been calibrated with a magnetic calibration disk which has crater shaped bumps which emulate predetermined asperities of the production run magnetic disk.

Other objects, features and advantages of this invention will become more apparent when referring to the following specification, claims and accompanying drawings.

BRIEF DESCRIPTION OF THE DRAWINGS

FIG. 1 is a top schematic illustration of a PZT slider checking for undesirable asperities on a production run disk.

FIG. 2 is a partial cross-sectional view through a production run disk with top and bottom PZT sliders shown in full checking for undesirable asperities on both sides of the production run magnetic disk.

FIG. 3 is a schematic block diagram of a test stand employing top and bottom PZT sliders for checking for undesirable asperities on a production run magnetic disk.

FIG. 4 is a top schematic illustration of a magnetic calibration disk being used to calibrate a top PZT slider, the calibration disk having a plurality of crater shaped bumps which emulate predetermined asperities of a production run disk.

FIG. 5 is a schematic cross-sectional view of a portion of the magnetic calibration disk being employed to calibrate top and bottom PZT sliders which are shown in full.

FIG. 6 is a schematic block diagram of a test stand with top and bottom PZT sliders being calibrated by a calibration disk, the calibration disk having bumps formed according to the present invention.

DETAILED DESCRIPTION OF THE PREFERRED EMBODIMENTS

Figure 7:
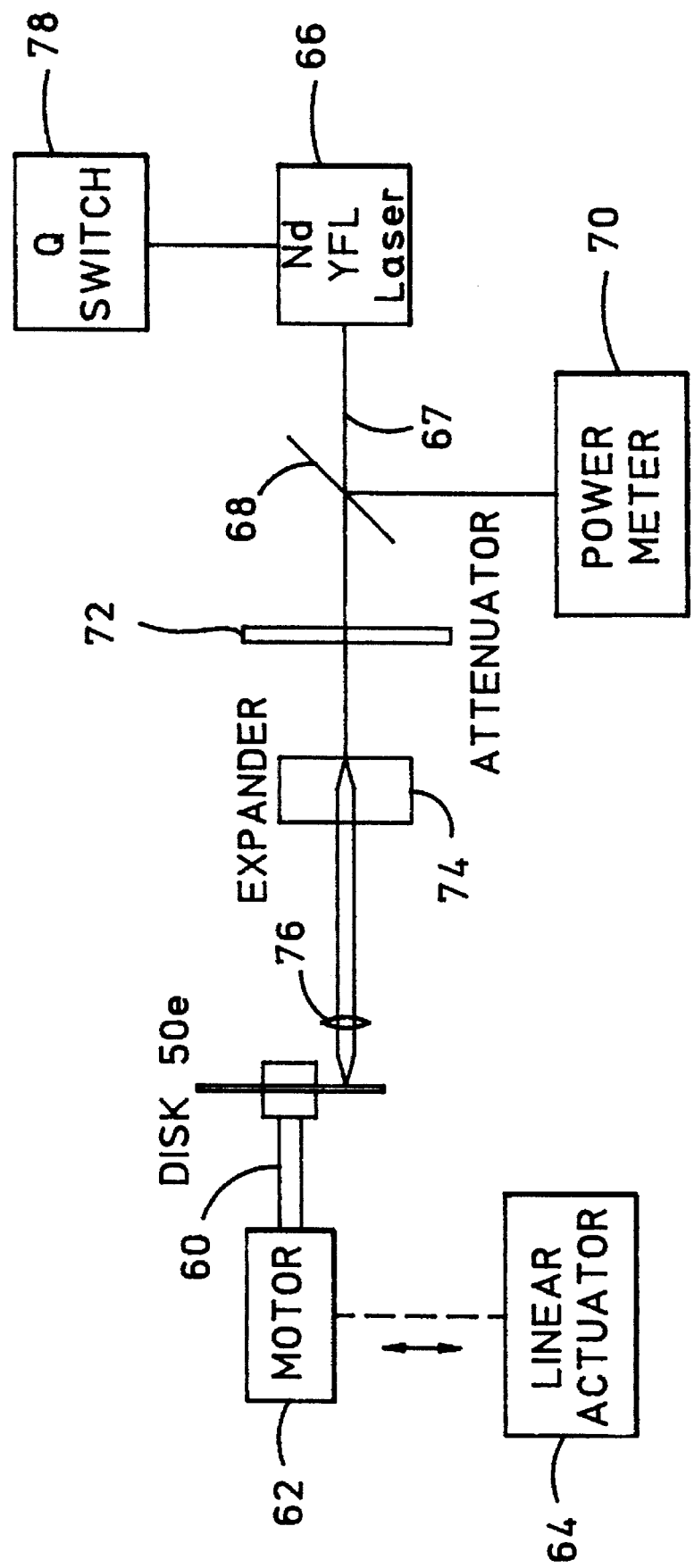
FIG. 7 is an exemplary schematic illustration of the method of making crater shaped bumps on a calibration disk by using multiple pulses of a laser beam.

Referring now to the drawings wherein like reference numerals designate like or similar parts throughout the similar views there is illustrated in FIG. 1 a double-sided magnetic calibration disk 20 which is being tested for asperities, such as undesirable asperity 22, by a PZT slider 24 which is mounted on a suspension 26. As shown in FIG. 1, the PZT slider 24 carries a piezoelectric transducer (PZT) 27. It is important that the PZT slider 24 be properly calibrated. If the PZT slider is not properly calibrated, it may miss detecting undesirable asperities or it may detect asperities which are not undesirable. Accordingly, the PZT test slider 24 must be calibrated with bumps which emulate one or more undesirable asperities, such as asperity 22, shown on the magnetic production run disk 20 in FIG. 1. FIG. 2 illustrates top and bottom PZT sliders 24 and 28 which are mounted on suspensions 26 and 30 respectively. The PZT slider 28 carries a piezoelectric transducer 27 which is substantially identical to the piezoelectric transducer 27 shown in FIG. 1 for the PZT slider 24. In FIG. 2, the top slider 24 is shown impacting the undesirable asperity 22. This asperity can be detected in a test stand as schematically illustrated in FIG. 3. FIG. 3 shows the top and bottom PZT sliders 24 and 28 being suspended on opposite sides of the production run magnetic disk 20 by the suspensions 26 and 30 respectively.

The disk 20 is mounted on a spindle 32 which is rotated by a drive motor 34. When the disk 20 is rapidly rotated, both of the PZT sliders 24 and 28 fly on an air bearing slightly off of the disk surfaces (in the order of 0.075 µm in todays products). When the asperity 22 is above this flying height, it is an undesirable asperity since it will impact the PZT slider. When this occurs, the slider portion of the PZT slider will flex causing the piezoelectric transducer on the slider to flex and move producing an electrical output which is read by a respective readout 35 via read electronics 36. This then indicates that the production run disk 20 having the asperity 22 should be discarded. Asperities which are below the threshold of being an undesirable asperity on the production run disk will be passed over by the PZT sliders, thereby indicating that the production run disk is satisfactory for its intended purpose. This is why it is important that the PZT sliders 24 and 28 be calibrated with a calibration disk which has crater shaped bumps which precisely emulate predetermined asperities of a production run disk. The other components, shown in FIG. 3, are standard components for a disk drive. The suspensions 26 and 30 are moved radially across the disk 20 by an actuator 38. Both the drive motor 34 and the actuator 38 are operatively connected to a control unit 40 so that linear movements of the suspensions 26 and 30 and the rotation of the spindle 32 can be coordinated.

The exemplary magnetic disk shown in FIG. 2 is a double-sided disk having top and bottom magnetizable layers 20a and 20b which are separated from a middle layer 20e by top and bottom intermediate layers 20c and 20d. The middle layer 20e is normally nickel phosphorus plated aluminum. The intermediate layers 20c and 20d are chrome $C_r$ and the top and bottom layers 20a and 20b are cobalt alloy. It should be understood that testing could be of a single-sided disk which includes only layers 20e, 20c and 20a.

A calibration disk 50 is shown in FIG. 4 which has calibration bumps 52 for calibrating the aforementioned PZT slider 24 on the suspension 26. This calibration must be properly accomplished before the PZT slider is employed for testing a production run magnetic disk 20, as illustrated in FIG. 3. If a double-sided production run disk 20 is to be tested, as shown in FIG. 3 the calibration disk 50 can likewise be double-sided, as illustrated in FIG. 5, with bumps on both sides. The calibration disk 50 can have the same structure as a production run disk 20. The calibration disk 50 may have top and bottom magnetizable layers 50a and 50 b which are separated from an intermediate layer 50 e by top and bottom layers 50c and 50d. As with the production run magnetic disk, the middle layer 50e of the calibration disk is normally nickel phosphorus plated aluminum, the intermediate layers may be chrome and the top and bottom magnetizable layers 20a and 20b may be cobalt alloy. If tests are to be made of only single-sided production run magnetic disks, then the calibration disk 50 would likewise be single-sided with only layers 50e, 50c and 50a.

FIG. 5 illustrates the PZT sliders 24 and 28 being suspended by suspensions 26 and 30 on both sides of the calibration disk 50. Both PZT sliders are shown impacting a calibration bump 52 which will cause the slider of each PZT slider to flex. This in turn causes the piezoelectric transducer carried by each slider to flex and produce an electrical output. FIG. 6 shows a test stand identical to the test stand of FIG. 3 except the calibration disk 50 is mounted on the spindle 32 and the readouts 35 from the PZT sliders 24 and 28 are calibration disk readouts instead of production run disk readouts as shown in FIG. 3. Proper testing of the production run disk in FIG. 3 depends upon how well the calibration bumps 52 on the calibration disk 50 in FIG. 4 simulate an undesirable asperity or asperities on the production run disk 20.

An exemplary method of making calibration bumps on the calibration disk is illustrated schematically in FIG. 7. It is preferred that the calibration bumps be made on the nickel phosphorus plated aluminum or disk 50e of the calibration disk 50, the disk being centrally mounted to a shaft 60 of a motor 62. A linear actuator 64 is connected to the motor for moving the motor up and down for a purpose to be described hereinafter. A laser, such as a Nd-YFL laser 66, is directed so that its laser beam 67 is impinged on one side of the disk 50e. A partially reflective mirror 68 may be located in the path of the beam for reflecting a portion of the beam to a power meter 70 which checks for power level of the laser beam. An attenuator 72 is located in the path of the beam 67 for controlling the amount of laser energy directed toward the disk 50e. The laser beam may then be expanded by an expander 74 after which it is focused by a lens 76 to a predetermined spot size on the surface of the disk 50e. The laser 66 may be switched on and off by a Q switch 78. Each time the Q switch 78 is operated, the laser emits a single pulse of laser energy in the form of the laser beam 67 onto the surface of the disk 50e. The Nd-FYL laser used in FIG. 7 produced a beam with a wave length of 1,047 nm.

Figure 8:
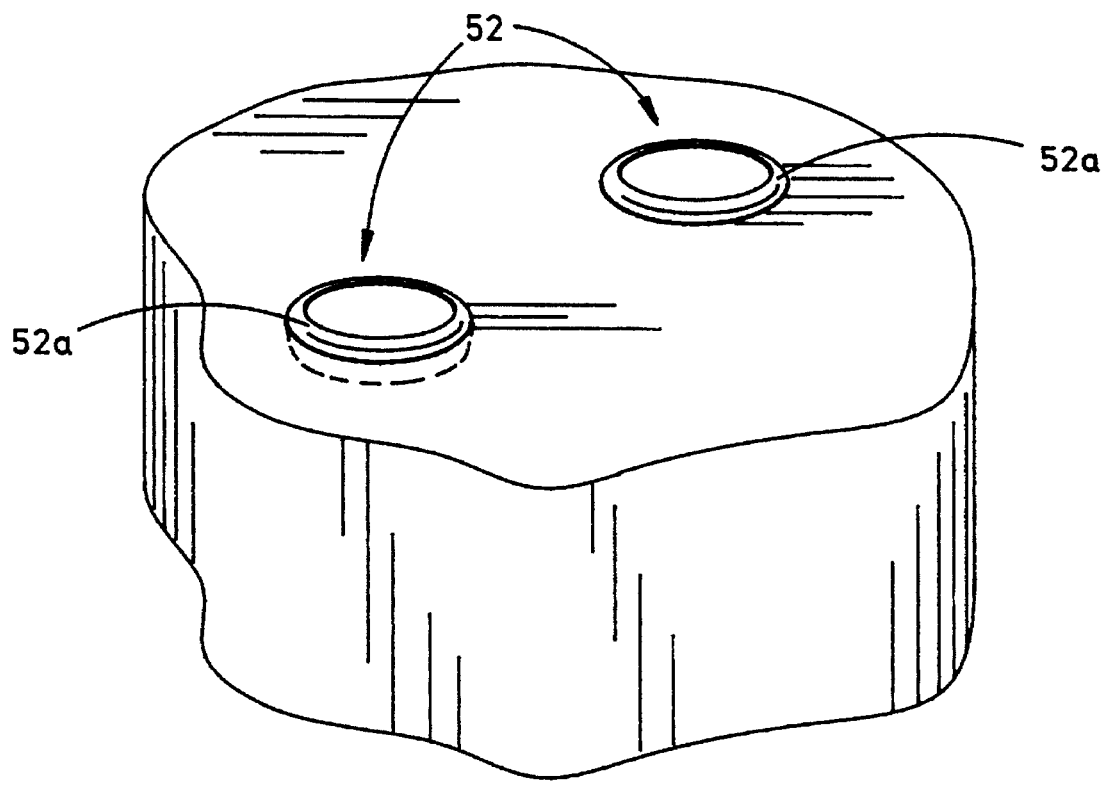
FIG. 8 is a portion of a top surface of a magnetic calibration disk, not to scale, illustrating several of the desired crater shaped bumps.
Figure 9:
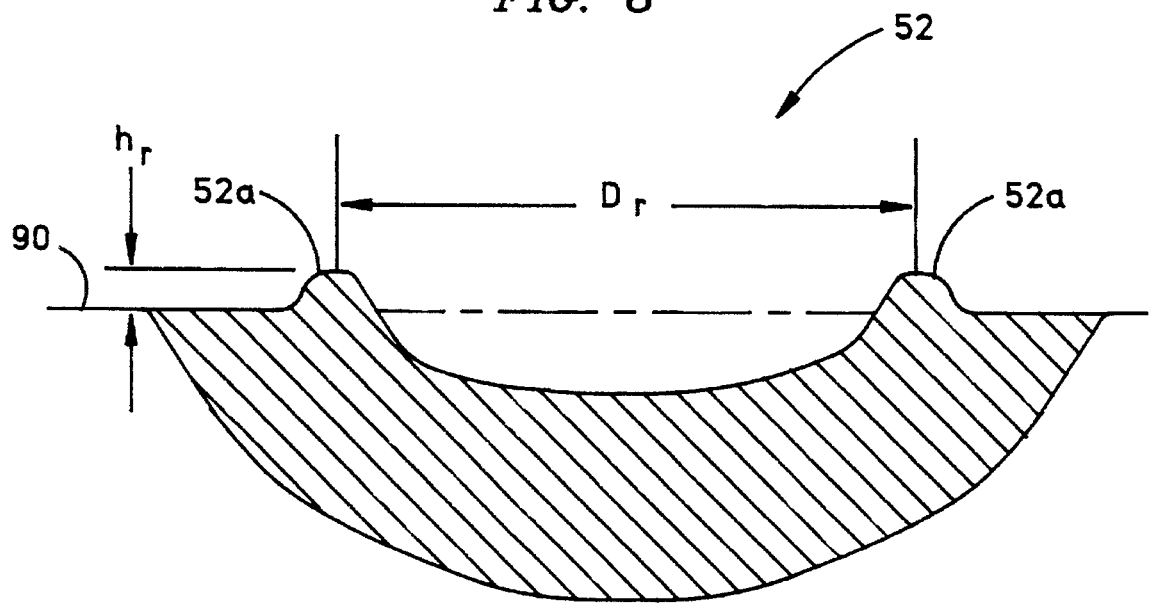
FIG. 9 is a schematic cross-sectional view, not to scale, of a desirable crater shaped bump for the calibration disk.

Reference is now made to FIGS. 8 and 9. In order for the crater shaped calibration bump 52 to emulate an undesirable asperity of a present day production run disk, the diameter $D_r$ of the crater shaped bump 52 should be in the range of 15 to 25 μm and it's peripheral ridge 52a should have a height $h_r$ above a nominal surface 90 of the intermediate layer 50e in the range of 75 to 120 nm. If the diameter $D_r$ is larger than 25 μm, the peripheral ridge slopes too little to noticeably impact the PZT slider. If the diameter is less than 10 μm, the durability and wear resistance of the crater shaped bump can be a problem. If the height of the peripheral ridge is less than 75 nm, the impact of the crater with a PZT slider is below range for simulating undesirable asperities on current production run disks. Likewise, if the height of the peripheral ridge is above 120 nm, it is above range for simulating undesirable asperities on a production run disk. Further, it is desirable that the height tolerance of the peripheral ridge be obtainable within a tolerance of 2 nm and that the diameter tolerance of the crater be within 2 μm. The above parameters have been carefully selected to cover the range of undesirable asperities on a production run disk which allows such a disk to be discarded after testing by the PZT slider. We have discovered that crater shaped bumps falling within these tightly controlled parameters can be made by a unique implementation of the laser set up shown in FIG. 7.

We have discovered that by impinging two or more pulses of laser energy onto the same location of the disk 50e we can achieve crater shaped bumps which have a diameter $D_r$ in the range of 5 to 20 μm and a height $h_r$ of the peripheral ridge above the nominal surface of the disk 50e in the range of 2 to 584 nm.

Figure 10:
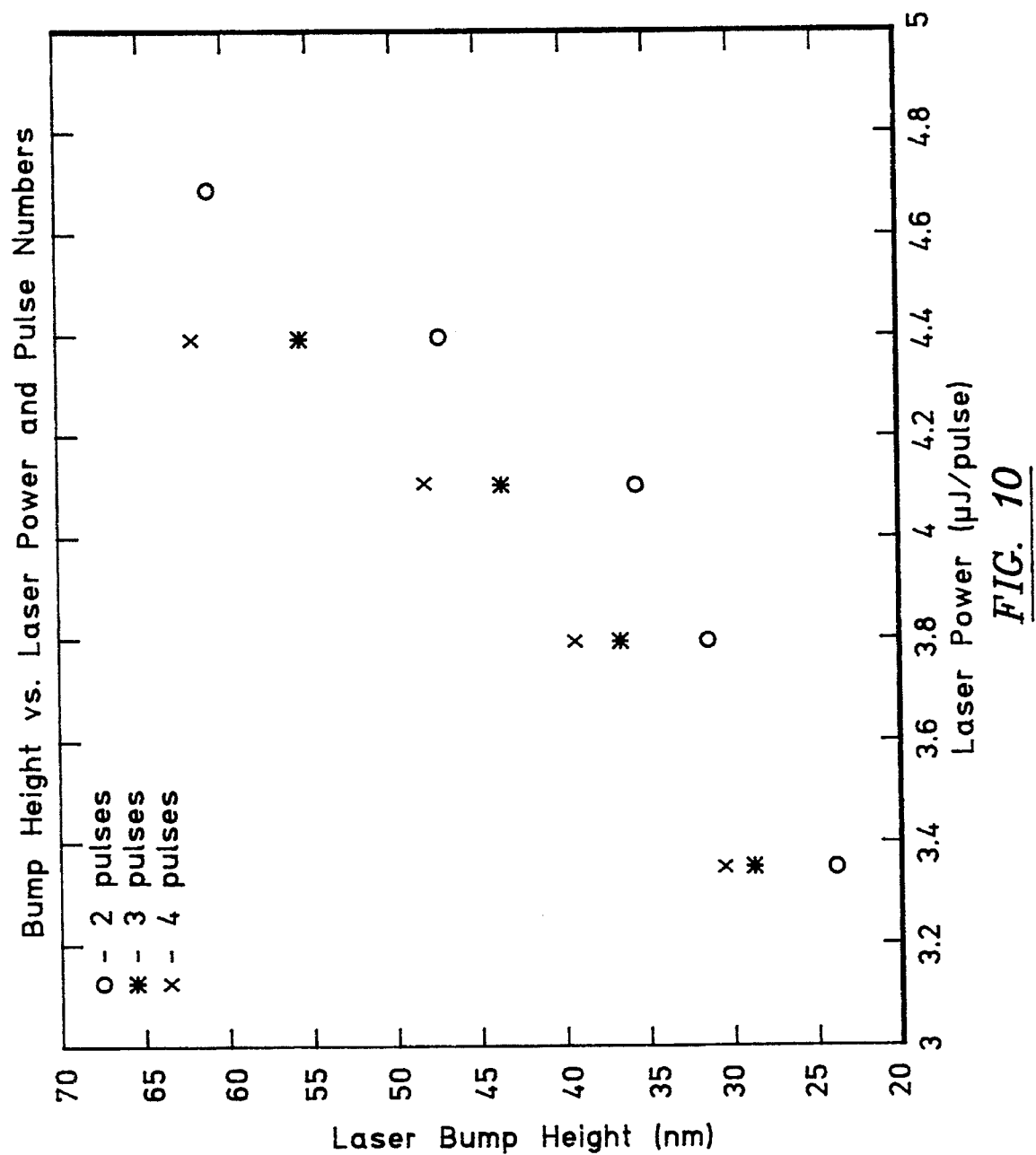
FIG. 10 is a chart showing bump height vs. laser power and pulse numbers.

FIG. 10 is a chart showing heights vs. laser power and number of laser pulses. Two pulses, 3 pulses and 4 pulses were employed at various laser powers producing various bump heights. It can be seen from this chart that for a particular laser power the bump heights progressively increase with additional laser pulses. At approximately a laser power of 3.3 μJ/cm$^2$, 2 laser pulses achieved a bump height of 23 nm, 3 laser pulses achieved a height of approximately 29 nm, and 4 laser pulses achieved a bump height of approximately 31 nm. The difference between 3 and 4 laser pulses was only 2 nm. This chart shows a range of laser power fluences of from 3.3 to 4.7.

Figure 11:
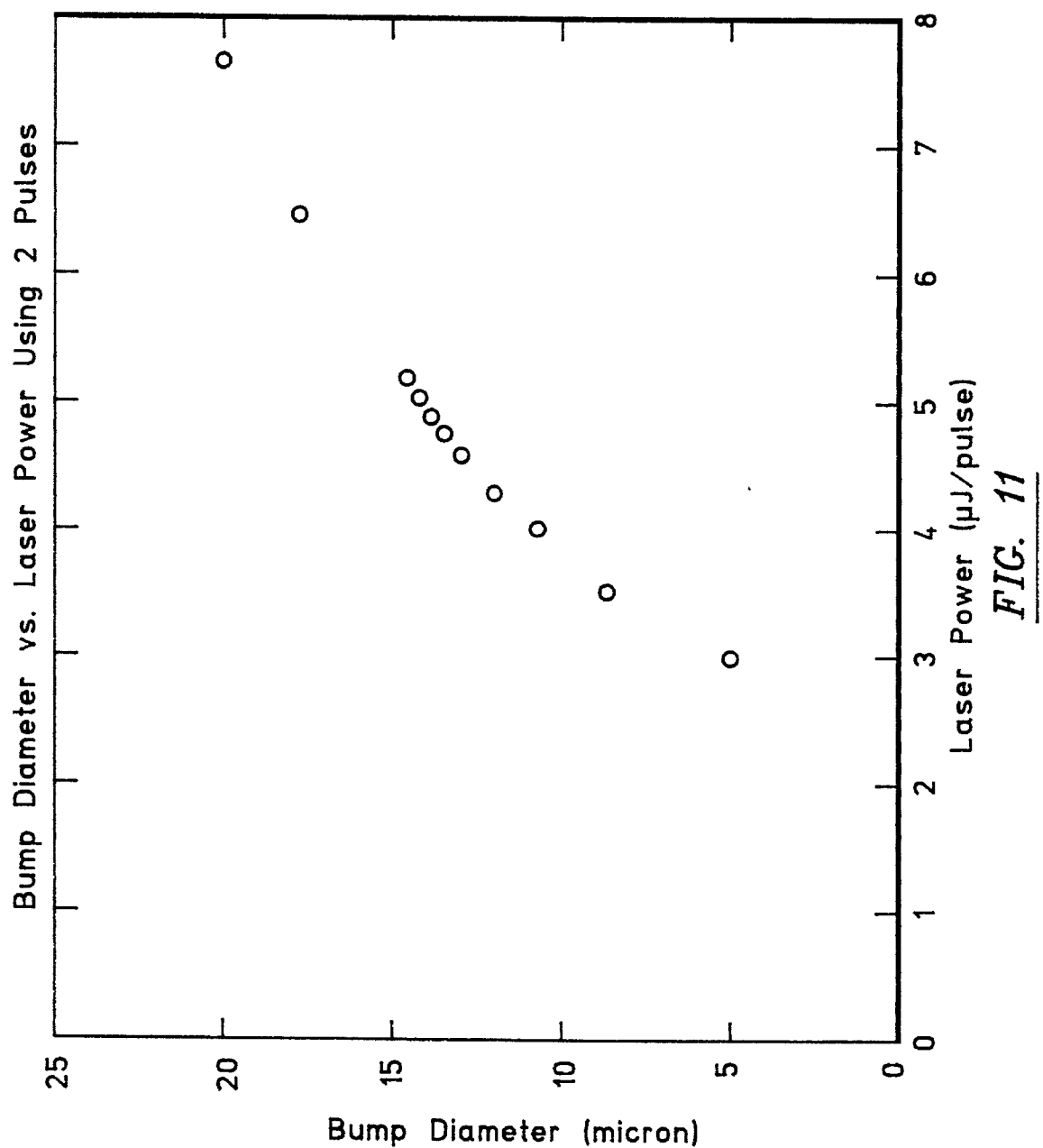
FIG. 11 is a chart showing bump diameter vs. laser power using 2 pulses.

FIG. 11 is a chart illustrating bump diameter vs. laser power using 2 laser pulses. The range of laser power fluences is from approximately 3 μJ/cm$^2$ to approximately 8 μJ/cm$^2$. It can be seen from this chart in the range from approximately 4.5 to 5 μJ/cm$^2$ that a bump diameter can be achieved within a tolerance of 2 microns.

Figure 12:
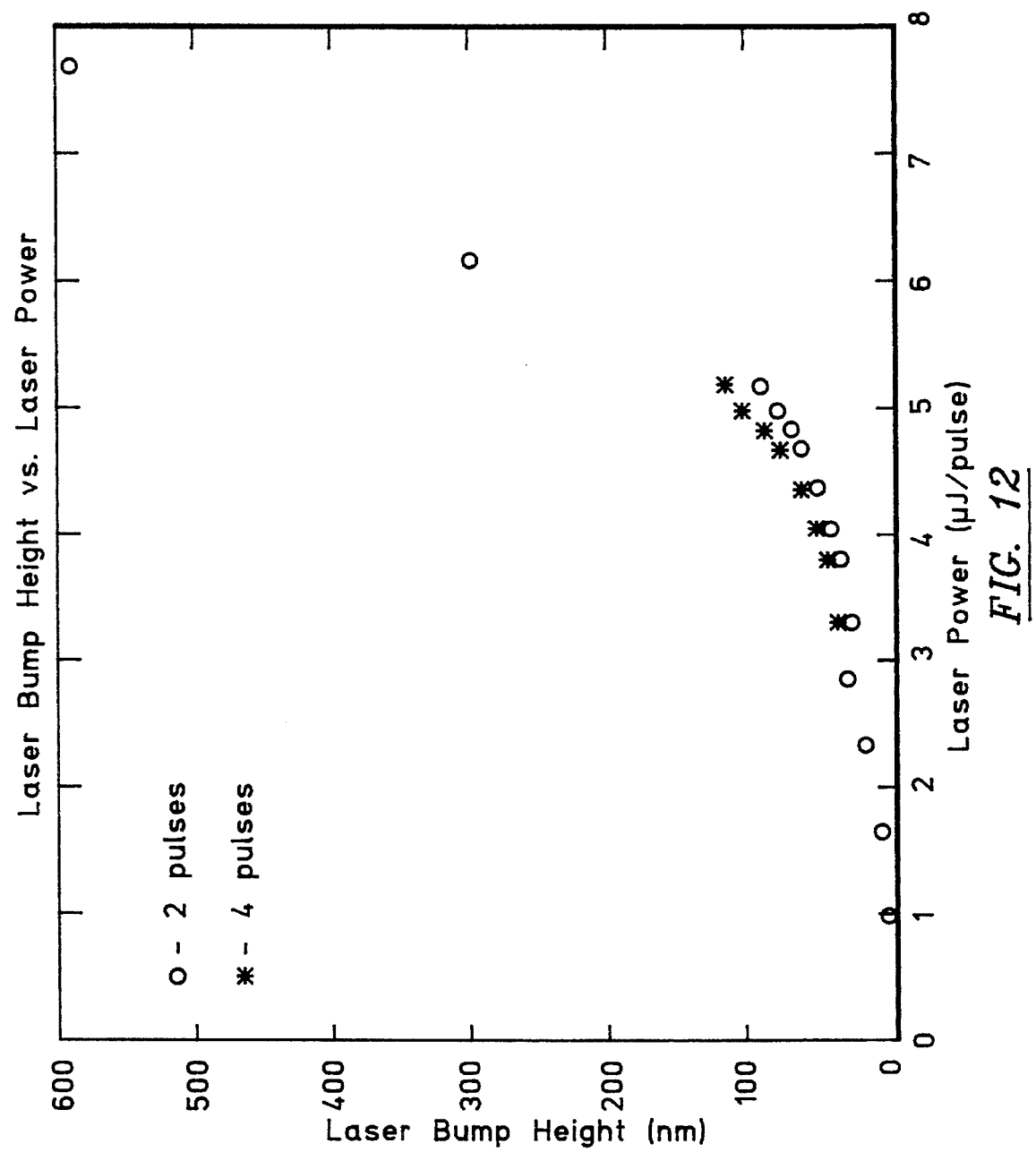
FIG. 12 is a chart showing laser bump height vs. laser power.

FIG. 12 is a chart showing laser bump height vs. laser power from 1 μJ to 7.7 μJ/cm$^2$. It can be seen from this chart that bump heights can be achieved in a range from about 2 nm to 584 nm.

Figure 13:
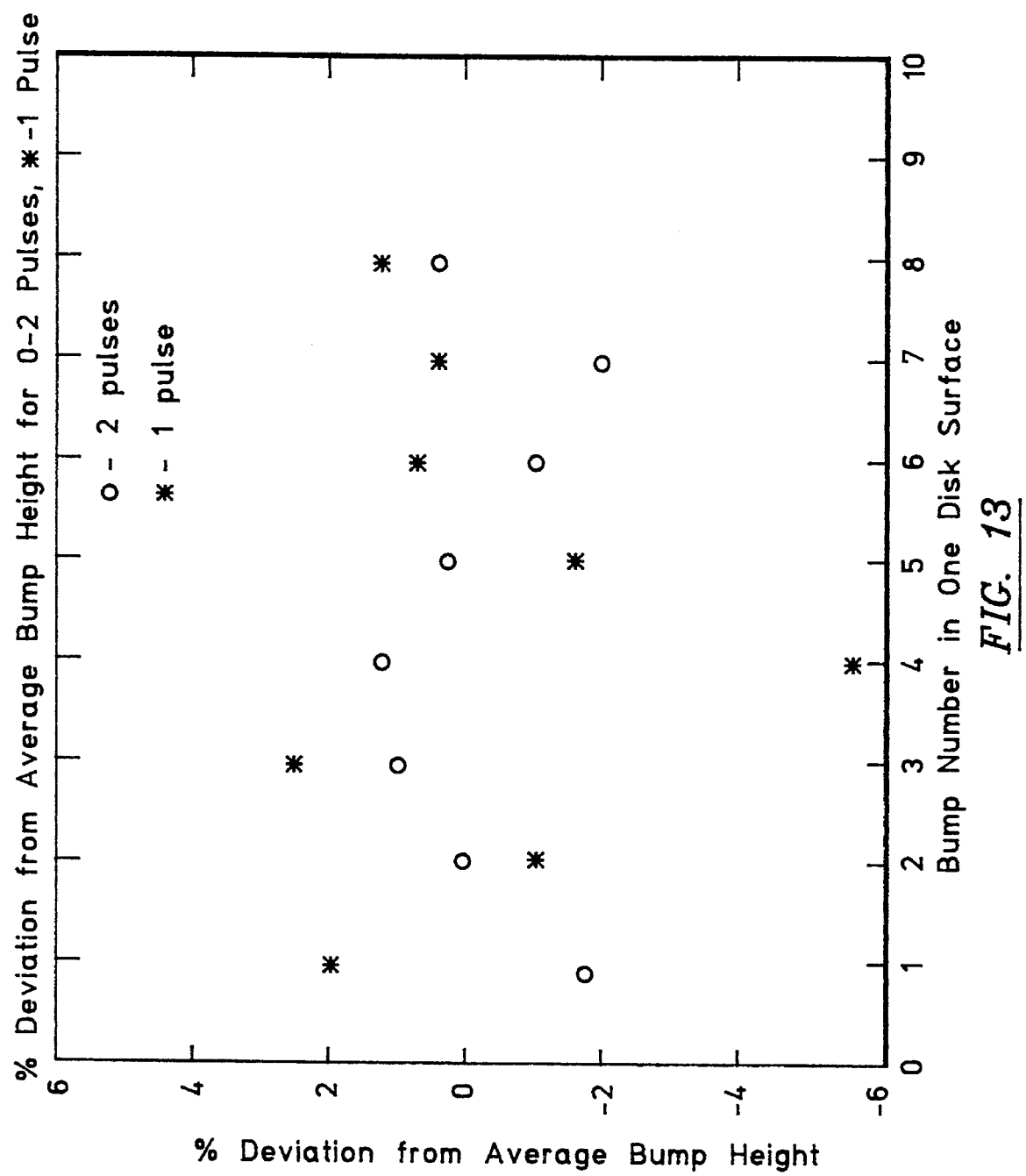
FIG. 13 is an example showing percent deviation from average bump height for 2 pulses and 1 pulse.

FIG. 13 is a chart illustrating percent deviation from an average bump height for 2 laser pulses and 1 laser pulse. Form this chart eight bumps were produced employing 2 pulses and eight bumps were produced employing 1 laser pulse. An average height for each set of eight bumps was employed as a comparison with each 2 pulse bump and each 1 pulse bump. It can be seen from this chart that the percent deviation from the average bump for the 2 pulse bumps was better than the percent deviation from the average bump for the 1 pulse bumps with the exception of bump number 7. This chart shows that 2 pulses produce bump heights within a closer tolerance than bump heights produced by 1 pulse. Further, when the number of pulses exceeds 2 the tolerance becomes even less as-indicated by the chart in FIG. 10.

The duration of a single pulse should be in the range of 5 to 100 ns. The spot size will control the diameter of the crater shaped bump. If the spot size is 10 μm, the diameter of the crater shaped bump will be approximately 15 μm. The duration between pulses can be in the order of a few milliseconds. It should be understood that other types of lasers, such as the Nd-YAG laser, can be employed provided the fluence is kept within the ranges set forth hereinabove.

After the one or more crater shaped bumps are formed on one side of the disk 50e, the disk 50e is reversed on the shaft 60, shown in FIG. 7, so that the other side of the disk can be fashioned with one or more crater shaped bumps. This will be the procedure when using double-sided disks as shown in FIGS. 3 and 6. If single-sided disks are involved, then only one side of the disk will be fashioned with crater shaped bumps. After fabrication of the crater shaped bumps, the layers 50c and 50d are deposited and then the layers 50a and 50b are deposited, as shown in FIG. 5. These layers are extremely thin and because of the wide lateral dimension of the crater shaped bumps, the crater shaped bumps produce substantially identical topography on the outside surfaces of the magnetizable layers 50a and 50b. It should be understood that the crater shaped bumps can be fabricated on other layers of the calibration disk other than the middle layer 50e, such as the intermediate layers 50c and 50d or the top and bottom magnetizable layers 50a and 50b. However, the preferred layer for fabrication of these crater shape bumps is the middle nickel phosphorus plated aluminum disk 50e.

A single crater shaped bump can be fabricated on a calibration disk for calibrating a PZT slider, however, it is preferred that multiple crater shaped bumps be fabricated as illustrated in FIG. 4. It is preferred that crater shaped bumps of the same size be fabricated along a single radius of the calibration disk. It is further preferred that a plurality of crater shaped bumps be fabricated along each of a plurality of radii of the calibration disk 50, as shown in FIG. 4 with the size of the crater shaped bumps in any radius being different from the size of the crater shaped bumps in any other radius. As shown in FIG. 4, the calibration disk 50 is provided with three radii of crater shaped bumps. The size of the crater shaped bumps in any one of these radii is preferably different from the size of the crater shaped bumps in any of the other radii. With this arrangement, the PZT slider 24 can be calibrated for a range of predetermined sizes of asperities on a production run magnetic disk by the differently sized crater shaped bumps 52 on the calibration disk 50. The method of making the crater shaped bumps along the radii, can be explained from the set up shown in FIG. 7. For the first radii, the disk 50e is held fixed in place while two or more pulses of laser energy are impinged on the same location. The motor and consequently the disk are then translated vertically by the linear actuator 64 to another location along the radius where the disk 50e is again held fixed in position while two or more pulses are impinged on a new location. This is repeated until the first radius is completed with the desired number of crater shaped bumps. The disk 50e is then rotated by the motor a desired angular amount and the process is repeated for a second radius. This process is continued until all radii of crater shaped bumps are completed.

The importance of having a plurality of crater shaped bumps of the same size along a single radius is so that the PZT slider 24 can be calibrated for different radius lengths across the disk 50. With four crater shaped bumps in a single radius, there are essentially four ring shaped calibration zones for the PZT slider. In each of these zones, the cushion of air provided by the rotating disk is slightly different since there is less disk surface rotating under the slider inwardly on the disk than there is outwardly on the disk. Consequently, the PZT slider can be calibrated according to concentric zones on the disk 50. By employing a plurality of radii of crater shaped bumps with the size of the bumps varying from radius to radius, the PZT slider can be calibrated for differently sized crater shaped bumps within each ring shaped zone. With this type of calibration, the PZT slider 24 is capable of testing for a range of asperities on a production run disk. Other arrangements of the crater shaped bumps on a calibration disk are also possible. For instance, a single radius could be provided with differently sized crater shaped bumps which allow for the decreasing fly height of the PZT slider over the disk 50 as it is moved inwardly. For some applications of PZT head calibration, the bumps may be made with arbitrary heights and patterns on the disk.

After fabrication of the crater shaped bumps on the calibration disk 50, the exact size of the bumps including the height of the peripheral ridge 50a can be determined by an atomic force microscope (AFM). The height of the crater shaped bumps can also be measured by a PZT slider flying over the bumps if the output of the piezoelectric transducer on the PZT slider is used in conjunction with known flying heights of the slider. These known flying heights are provided by a speed-spacing curve (not shown) which can be obtained by a white light Interferometer.

In FIG. 7, the laser beam is directed at a perpendicular angle to the disk 50e. It should be understood, however, that the laser beam could be directed at an oblique angle which would result in an elliptical crater shaped bump with a well-formed ridge. A well-formed elliptical crater could also be fabricated by using an elliptical laser beam which is focused in such a manner by one or more lenses. It should be understood that the present invention can be employed for purposes other than fabricating calibration bumps on calibration disks. The invention can be employed for any article where bumps are desired with a protrusion which is higher than that which can be obtained from a single laser pulse or must be within a close tolerance.

Obviously, many modifications and variations of the present invention are possible in light of the above teachings. It is therefore to be understood that, within the scope of the appended claims, the invention may be practiced other than as specifically described.

We claim:

1. A method of making a crater shaped bump on a calibration disk which emulates an asperity on a production run magnetic disk, the crater shaped bump having a peripheral ridge which projects upwardly from a nominal surface of the calibration disk a predetermined height $h_r$ comprising the steps of:

maintaining the calibration disk in a fixed position; and while maintaining the calibration disk in a fixed position impinging at least two pulses of laser energy on the calibration disk until the peripheral ridge of the crater shaped bump projects upwardly from the nominal surface of the calibration disk said predetermined height $h_r$.

2. A method as claimed in claim 1 including:

the diameter $D_r$ of the crater shaped bump being in the range of 5 to 20 μm; and the height $h_r$ of the peripheral ridge above the nominal surface of the calibration disk being in the range of 30 to 120 nm.

3. A method as claimed in claim 1 including:

the diameter $D_r$ of the crater shaped bump being in the range of 10 to 25 μm; and the height $h_r$ of the peripheral ridge above the nominal surface of the calibration disk being in the range of 30 to 584 nm.

4. A method as claimed in claim 1 including:

maintaining the calibration disk in a plurality of fixed positions with said plurality of fixed positions being aligned along at least one radius of the calibration disk; and while maintaining the calibration disk in each fixed position of said plurality of fixed positions impinging at least two laser pulses onto the layer of the calibration disk to produce a crater shaped bump at each fixed position with a peripheral ridge which projects upwardly above said nominal surface of a layer of the disk said predetermined height $h_r$.

5. A method as claimed in claim 1 wherein each laser pulse has a fluence in the range of 3.3 to 7.8 J/cm$^2$.

6. A method as claimed in claim 1 wherein a duration of a single pulse of laser energy on said one of the layers of the calibration disk is in the range of 5 to 120 ns.

7. A method as claimed in claim 6 wherein the laser energy has a fluence in the range of 3.3 to 7.8 J/cm$^2$.

8. A method as claimed in claim 7 including:

the diameter $D_r$ of the crater shaped bump being in the range of 5 to 20 μm; and the height $h_r$ of the peripheral ridge above the nominal surface of the calibration disk being in the range of 2 to 120 nm.

9. A method as claimed in claim 8 including:

maintaining the calibration disk in a plurality of the fixed positions with said plurality of the fixed positions being aligned along at least one radius of the calibration disk; and while the calibration disk in each fixed position of said plurality of fixed positions impinging at least two laser pulses on the calibration disk to produce a crater shaped bump at each fixed position with peripheral ridge which projects upwardly from said nominal surface of the calibration disk said predetermined height $h_r$.

10. A method of making crater shaped bumps on a calibration disk which emulate asperities on a production run magnetic disk, each crater shaped bump having a peripheral ridge which projects upwardly from a nominal surface of the calibration disk a predetermined height comprising the steps of:

maintaining the calibration disk in a plurality of fixed positions along a plurality of radii; and while maintaining the calibration disk in the plurality of fixed positions impinging a sufficient number of laser pulses greater than one on the calibration disk at each fixed position to produce crater shaped bumps with the same height along each radius but with different heights from radius to radius so that the height of the crater shaped bumps along any radius of the calibration disk is different from the height of the crater shaped bumps along any other radius of the calibration disk.

11. A method of making crater shaped bumps on a calibration disk which emulate asperities on a production run magnetic disk, each crater shaped bump having peripheral ridge which projects upwardly from a nominal surface of the calibration disk a predetermined height $h_r$ comprising the steps of:

maintaining the calibration disk in a plurality of the fixed positions with said plurality of the fixed positions being aligned at least one radius of the calibration disk;

while maintaining the calibration in each fixed position of said plurality of fixed positions impinging at least two laser pulses on the calibration disk to produce a crater shaped bump at each fixed position with a peripheral ridge which projects upwardly from said nominal surface of the calibration disk said predetermined height $h_r$;

each laser pulse having a fluence in the range of 3.3 to 7.8 J/cm$^2$ and a duration in the range of 5 to 120 ns;

the diameter $D_r$ of the crater shaped bump being in the range of 5 to 120 μm; and the height $h_r$ of the peripheral ridge above the nominal surface of the calibration disk being in the range of 2 to 120 nm.

12. A method of making crater shaped bumps on a calibration disk which emulate asperities on a production run magnetic disk, the crater shaped bumps having peripheral ridges which project upwardly from a nominal surface of the calibration disk a common predetermined height or varying predetermined heights comprising the steps of:

maintaining the calibration disk in a plurality of sequential fixed positions; and while maintaining the calibration disk in the plurality of fixed positions impinging a sufficient number of laser pulses greater than one on the calibration disk at each fixed position to produce crater shaped bumps with said common predetermined height or said varying predetermined heights.

13. A method as claimed in claim 12 including:

the diameter $D_r$ of each crater shaped bump being in the range of 5 to 20 μm; and the predetermined height of the peripheral ridge of each crater shaped bump above the nominal surface of the calibration disk being in the range of 2 to 120 nm.

14. A method as claimed in claim 13 wherein each laser pulse has a fluence in the range of 3.3 to 7.8 J/cm$^2$ and a duration in the range of 5 to 120 ns.

\* \* \* \* \*